United States Patent [19]

Penczak

[11] 4,065,896
[45] Jan. 3, 1978

[54] BOTTOMLESS TRENCH DUCT

[75] Inventor: John P. Penczak, Euclid, Ohio

[73] Assignee: Bargar Metal Fabricating Co., Cleveland, Ohio

[21] Appl. No.: 779,729

[22] Filed: Mar. 21, 1977

[51] Int. Cl.$^2$ .............................................. E04B 5/48
[52] U.S. Cl. ........................................ 52/220; 174/48
[58] Field of Search .................... 52/220, 221, 173 R; 174/48, 49

[56] References Cited

U.S. PATENT DOCUMENTS

| | | | |
|---|---|---|---|
| 3,435,568 | 4/1969 | Hoseason et al. | 52/221 |
| 3,577,863 | 5/1971 | Hudnall | 52/220 |
| 3,592,956 | 7/1971 | Fork | 52/221 |
| 3,593,472 | 7/1971 | Bargar | 52/221 |
| 3,721,051 | 3/1973 | Fork | 174/49 |
| 3,903,666 | 9/1975 | Fork | 174/49 |
| 3,932,696 | 1/1976 | Fork | 174/48 |

Primary Examiner—James L. Ridgill, Jr.

[57] ABSTRACT

An underfloor electrical distribution system is comprised of a bottomless trench duct transversely overlying a cellular subfloor deck assembly. The bottomless trench duct has spaced-apart, parallel L-shaped side rails, the vertical legs of which terminate in an inverted U-shaped channel and form the sidewalls of the trench. Preshaped void closure plates, which are attached to the side rails, transversely extend into the troughs of the cellular subfloor deck assembly to prevent the ingress of concrete into the trench duct while the concrete floor is being constructed. The preshaped void closure plates may be held in place within the inverted U-shaped channel by means of rivets fastened to the vertical leg of the side rail. Alternatively, horizontal slots in the inverted U-shaped channel may be cut to receive the void closure plates, which are frictionally held within the U-shaped channel.

15 Claims, 11 Drawing Figures

U.S. Patent  Jan. 3, 1978  Sheet 1 of 3  4,065,896
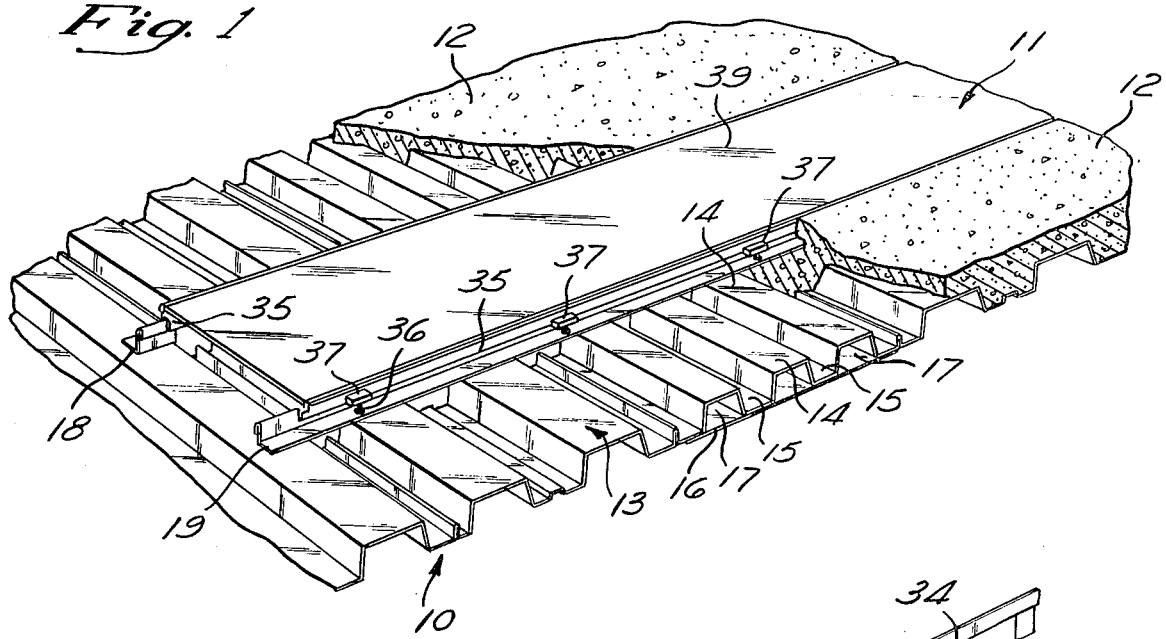
Fig. 1
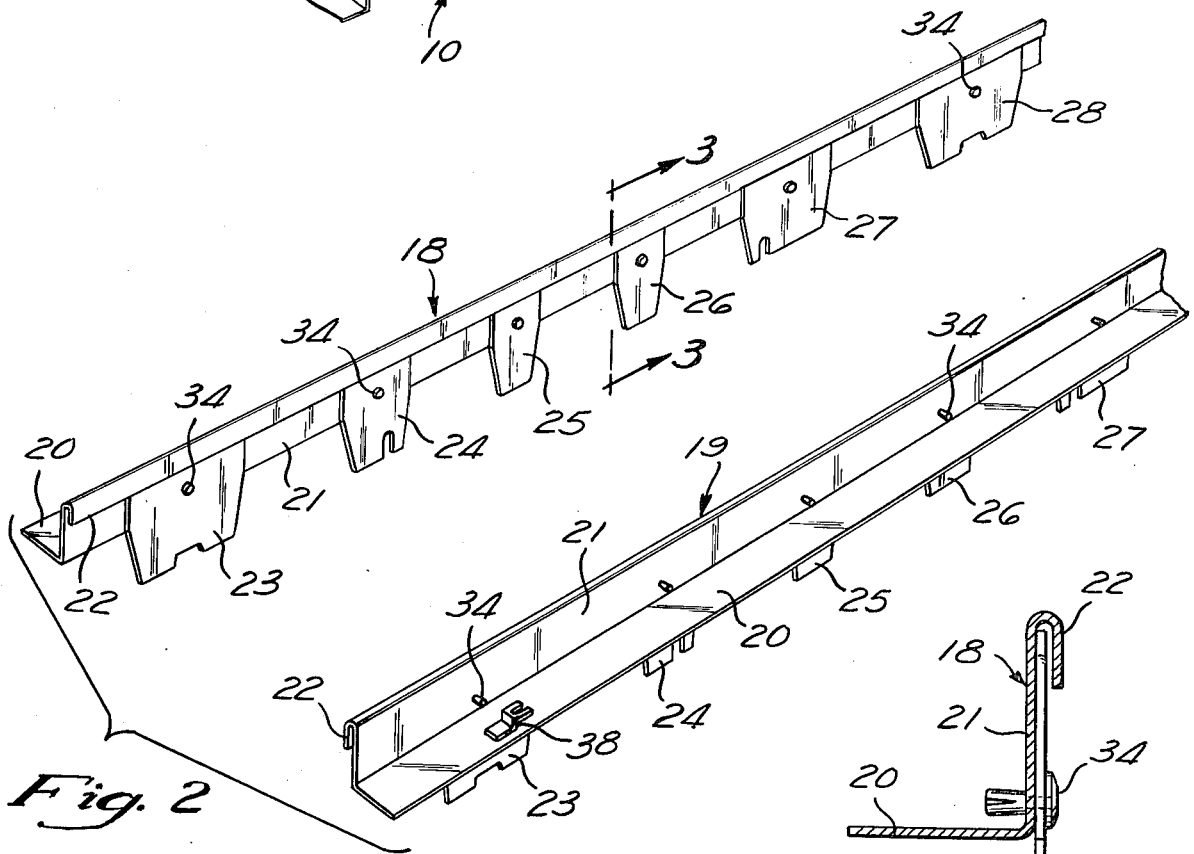
Fig. 2
Fig. 3

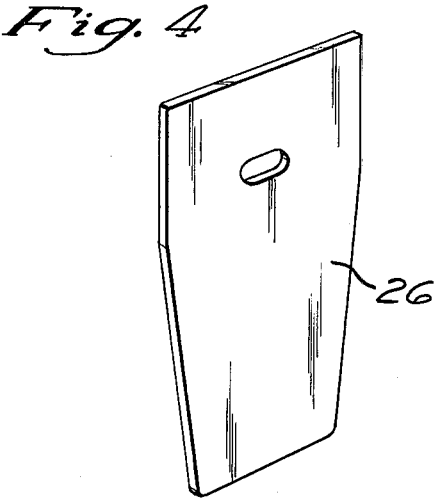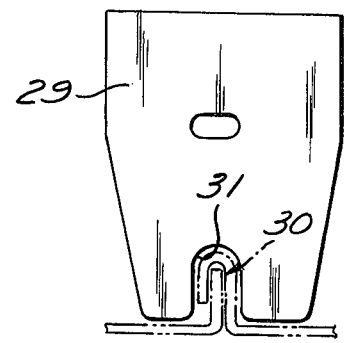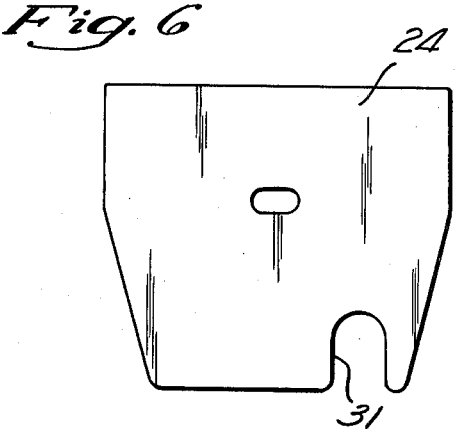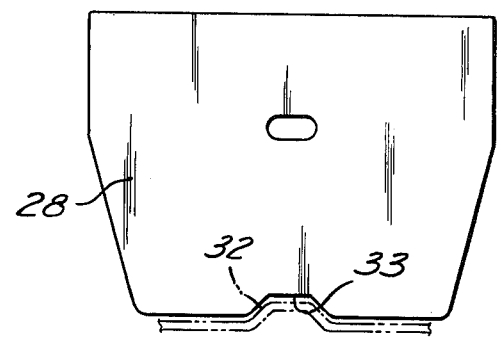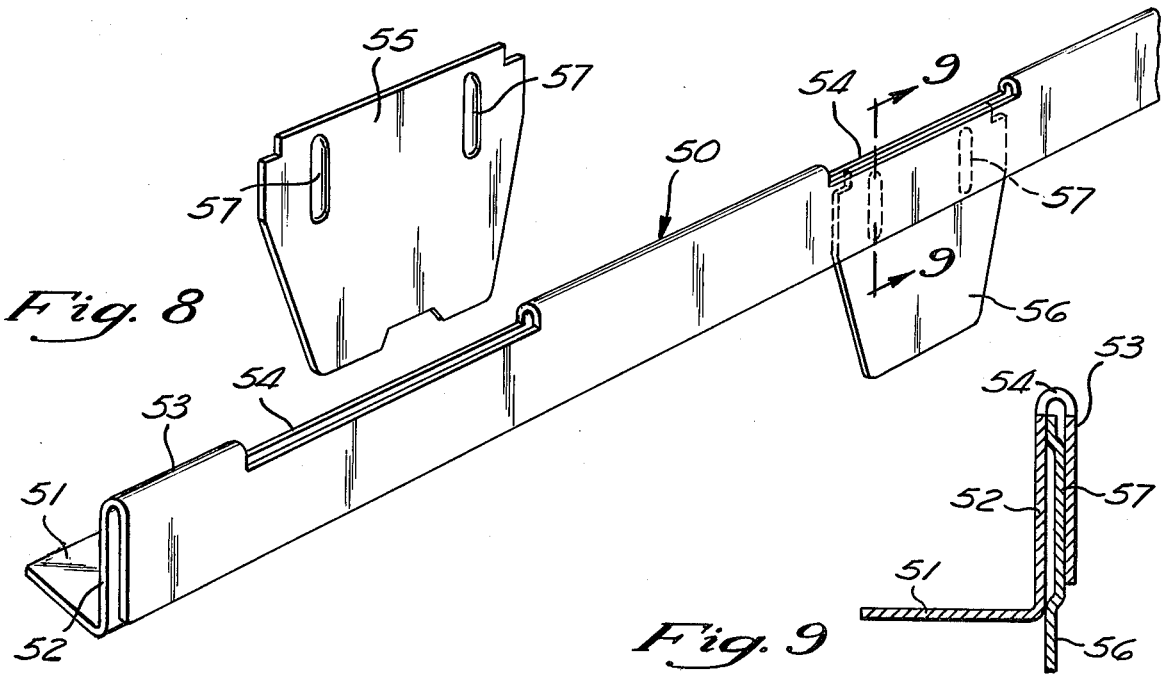

4,065,896

BOTTOMLESS TRENCH DUCT

BACKGROUND OF THE INVENTION

This invention relates to void closures used in a bottomless trench duct in an underfloor wire distribution system.

The underfloor wiring system is comprised of a cellular subfloor deck assembly through which electrical and communication wires are channeled. Generally, the cellular subfloor deck consists of a base wall and a corrugated upper wall having a plurality of crests and troughs. The base wall need not be continuous, but may be discontinuous to define predetermined raceway cells with the corrugated upper wall. Overlying the cellular subfloor at right angles to the raceway cells are one or more bottomless trench ducts, the top walls of which are provided with removable access cover plates. The electrical and communication wires are strung through the trench duct and access openings are provided in predetermined raceway cells so that the wires may be branched into the raceways for communication with electrical and communication terminals and connectors.

Underfloor trench ducts for wiring systems are frequently used in buildings where many electrical and communication outlets are required. Some typical examples of trench ducts are disclosed in the following U.S. Pat. Nos.: 3,435,568; 3,453,791; 3,721,051; and 3,593,472.

In forming a bottomless trench duct, the problem encountered is to keep the concrete from flowing into the trough in the cellular subfloor below the side rails of the trench duct. In the past, the troughs have been blocked off by means of plugs disposed under the sidewall of the trench duct or the inner sidewall of the trench duct has been formed with vertically downwardly extending portions to block off the trough, as is disclosed in U.S. Pat. No. 3,721,051.

The plugging method of blocking the trough is unsatisfactory because the plug may become dislodged and move out of position while the concrete is being poured. The alternative method of cutting downwardly extending projections on the inner sidewalls of the trench duct is unsatisfactory because the troughs are not of uniform shape and spacing, and in order to accommodate the various irregular spacings and configurations of the trough, the projections on the sidewalls must be precut or stamped in small sections. This operation requires the use of many different dies, and results in the need for many end welds on the short side rail sections.

SUMMARY OF THE INVENTION

The present invention overcomes many of the prior art problems in blocking concrete from the duct by providing void closures which are provided in a variety of shapes to accommodate different trough shapes and which may be attached to the side rails of the trench duct at locations which will accommodate different trough spacings of the cellular subfloor.

In the present invention, therefore, the void closures are not an integral part of the side rail and so the side rail may be cut to longer lengths, e.g., 10 feet, thereby spanning the width of several cross sections of the cellular subfloor duct assemblies, and thus eliminating the need for several end welds on the supporting side rails.

The trench ducts have parallel L-shaped supporting side rails. The horizontal leg of the side rail is fastened to the top walls of the cells of the subfloor assembly by, for example, tack welding. Individual void closures are precut to conform to the configuration of the trough and they may be attached to the vertical leg of the side rails by means of rivets, or they may be inserted through slots spaced along the inverted U-shaped channel on the side rail. The void closures may be attached to the side rails by the manufacturer before shipment or by the workers at the job site. When the bottomless trench duct is assembled and the void closures are in place, the concrete floor is poured around the trench covering the side rails to a level flush with the top wall of the trench. The vertical leg of each side rail is straddled by an extruded rail, which supports the removable access cover to define the trench. The extruded rail is vertically adjustable relative to its side rail so that it may be adjusted to the level of the concrete to be poured. From the trench duct, access may be had to the cellular raceways by periodic openings in those raceways.

BRIEF DESCRIPTION OF THE DRAWINGS

FIG. 1 is a fragmentary, perspective view of a cellular subfloor having a bottomless trench duct installed thereon in accordance with the teachings of this invention;

FIG. 2 is a fragmentary, perspective view of a pair of side rails having void closures attached thereto according to one aspect of the present invention;

FIG. 3 is a cross sectional view, the plane of the section being indicated by the line 3—3 in FIG. 2;

FIGS. 4 through 7 illustrate various forms of void closures according to this invention;

FIG. 8 is a fragmentary view of a side rail and its void closures according to a still further aspect of this invention;

FIG. 9 is a fragmentary, cross sectional view, the plane of the section being indicated by the line 9—9 in FIG. 8;

DETAILED DESCRIPTION OF THE INVENTION

Figure 10:
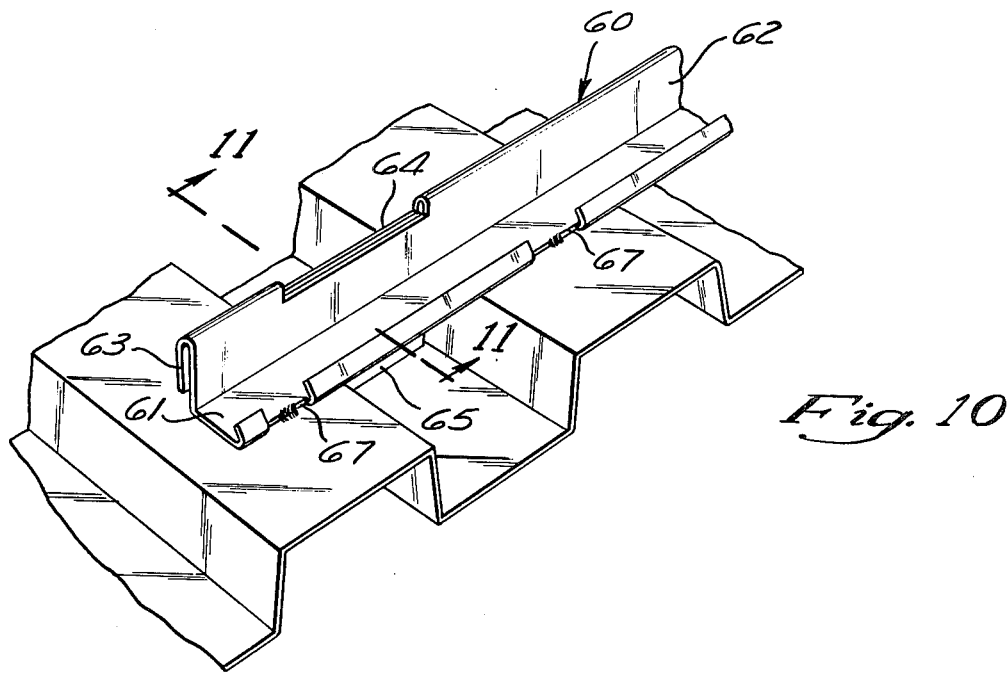
FIG. 10 is a fragmentary, perspective view of a side rail according to a further aspect of this invention.

Referring now to the drawings, and particularly to FIGS. 1 through 7, there is illustrated an underfloor electrical distribution system which includes a cellular subfloor duct assembly 10 and a bottomless trench duct 11. The cellular floor unit 10 is embedded in and covered by the concrete 12 of the floor. The cellular floor unit includes a top plate 13 formed with alternate crests 14 and troughs 15. The floor unit also includes a bottom plate which may extend beneath a predetermined number of crests 14 and troughs 15, as illustrated in FIG. 1, or may extend beneath all of the crests and troughs. The top plates 13 and the base plate 16 cooperate to define a plurality of raceway cells 17 which extend along the floor parallel to each other to receive wire and cable of an electrical distribution system.

The wire and cable are fed into a raceway cell 17 by the trench duct 11 which runs generally perpendicular to the cells 17, and to provide access to the cells a predetermined number of holes are cut through the crests 14. The trench duct 11 comprises a pair of spaced supporting side rails 18 and 19, which run generally perpendicular to the crests and troughs 14 and 15. Each side rail is generally L-shaped, and has a horizontal leg portion 20 and a vertical leg portion 21 terminating in an inverted, U-shaped channel 22. The horizontal leg 20 is tack welded to the crests 14. Each side rail 18 and 19 is provided with individually replaceable void closures 23-28, which have configurations which are adapted to conform to the particular configuration of the trough into which they enter. For example, the void closure 26, as shown in FIG. 4, is intended to close a trough having a flat bottom and flat sloping sidewalls. A void closure 29 (FIG. 5) and the void closure 24 (FIG. 6) are intended to conform to a seam 30 between adjacent sections of the duct assembly by having a U-shaped portion 31 cut therefrom. Stiffening ribs 32 may be provided in some of the troughs 15 and FIG. 7 illustrates that the void closure 28 is adapted to conform to that stiffening rib by having a cut-out portion 33 in its bottom edge.

As may best be seen in FIG. 3, each void closure 23-28 is affixed to the side rails 18 and 19 by rivets 34 and in-plane twisting of the void closures is prevented, since the top of the closure projects into the U-shaped channel 22. This operation may be done at the job site or by the manufacturer after determining the spacing between the troughs and the particular configuration of the troughs.

A removable cover assembly is provided to close the trench duct. This assembly includes extruded rails 35 having bifurcated lower portions which loosely fit over the U-shaped channel 22. Such side rails are shown more clearly in U.S. Pat. No. 3,593,472, the subject matter of which is incorporated herein by reference. The extruded side rails 35 may be adjusted relative to the side rails 18 and 19 by adjusting screws 36 attached to the side rails 35, but which are axially movable relative to the side rails 35 by being unthreaded from a block 37. The head of the adjusting screws 36 is received under one of a series of clips 38 spot welded to the horizontal leg portion of the side rails 18 and 19. A removable hatch cover 39 closes the trench duct.

Referring now to FIGS. 8 and 9, a side rail assembly according to another aspect of this invention is illustrated. The side rail assembly includes a generally L-shaped supporting side rail 50 having a horizontal leg portion 51 and an upwardly extending vertical leg portion 52 terminating in an inverted U-shaped channel 53. Notches 54 are cut into the U-shaped channel to receive individually replaceable void closures 55 and 56. The void closures 55 and 56 may be driven through the notches 54 by a hammer after the side rails are spot welded to the cellular subfloor so that the void closures 55 and 56 seek their proper seated positions within the troughs. The closures 55 and 56 form a tight frictional fit relative to the side rails 50, since they are provided with dimples 57, which are wedged in the U-shaped channel 53.

Figure 11:
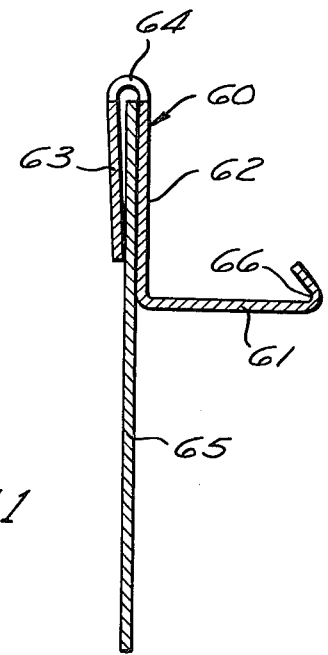
FIG. 11 is a cross sectional view, the plane of the section being indicated by the line 11—11 in FIG. 10.

Referring to FIGS. 10 and 11, there is illustrated a side rail assembly according to a still further aspect of this invention. The side rail assembly includes a generally L-shaped supporting side rail 60 having a horizontal leg portion 61 and an upwardly extending vertical leg portion 62 terminating in an inverted U-shaped channel 63. Notches 64 are cut into the U-shaped channel to receive individually replaceable void closures 65. The void closures 65 may be driven through the notches 64 by a hammer after the side rails are tack welded to the cellular subfloor so that the void closures 65 seek their proper seated positions within the troughs. The closures 65 form a tight frictional fit relative to the side rails 60, since metal forming the U-shaped channel 63 is bent inwardly, as may be seen in FIG. 11. The edge of the horizontal leg portion 61 is turned up to form a channel 66 for receiving the adjusting screws of the extruded side rails, such as the adjusting screws 36 of the side rails 35. Slots 67 are cut into the channel 66 to facilitate tack welding and the insertion of the adjusting screws.

The invention is not restricted to the slavish imitation of each and every detail set forth above. Obviously, devices may be provided which change, eliminate, or add certain specific details without departing from the scope of the invention.

What is claimed is:

1. In an underfloor electrical distribution system, including a cellular subfloor duct assembly having crests and troughs defining raceway cells, a bottomless trench duct comprising a cover and spaced supporting side rail means fixed to said crests and running generally perpendicular thereto said cover being attached to said supporting side rail means, and individually replaceable void closure means depending from said supporting side rails into said troughs, whereby a closure means may be chosen to conform to the configuration of a particular trough and a series of closure means may conform to the spacing between troughs.

2. A bottomless trench duct according to claim 1, wherein said supporting side rails are generally L-shaped having a horizontal leg portion transversely overlying said cellular subfloor duct assembly, and an upwardly extending vertical leg portion terminating in an inverted U-shaped channel adapted to receive a plurality of individually replaceable void closure means.

3. A bottomless trench duct according to claim 2, wherein said individually replaceable void closure means is comprised of a substantially flat plate having a periphery shaped to conform to the configuration of a particular trough, wherein at least one surface of said void closure plate is dimpled, and wherein said U-shaped channel is adapted to hold said void closure means.

4. A bottomless trench duct according to claim 2, wherein said upwardly extending vertical leg portion of the supporting side rail is provided with spaced means defining apertures adapted to receive rivets.

5. A bottomless trench duct according to claim 2, wherein said individually replaceable void closure means is comprised of a substantially flat plate having a periphery shaped to conform to the configuration of a particular trough and having means defining apertures located on said closure means adapted to receive rivets and wherein said void closure plate is rigidly connected to said vertical leg portion of the side rail.

6. A bottomless trench duct according to claim 2, wherein said inverted U-shaped channel of the supporting side rail is provided with a plurality of spaced slots which are adapted to receive a plurality of individually replaceable void closure means within said U-shaped channel.

7. A bottomless trench duct according to claim 6, wherein said U-shaped channel is bent inwardly toward said vertical leg to hold said void closure means.

8. A bottomless trench duct according to claim 6, wherein an edge of said horizontal leg is bent upwardly to form a channel.

9. A bottomless trench duct according to claim 8, wherein slots are cut into the channel on said horizontal leg.

10. A bottomless trench duct comprising a cover and supporting side rail means adapted to be affixed to a cellular subfloor duct assembly said cover being attached to said supporting side rail means, said subfloor duct assembly having crests and troughs running generally perpendicularly to said duct, a plurality of individually replaceable void closure means depending from said side rail means, said void closure means having a periphery shaped to conform to the configuration of a particular trough.

11. A bottomless trench duct according to claim 10, wherein said supporting side rail is generally L-shaped having a horizontal leg portion transversely overlying said cellular subfloor duct assembly and wherein said horizontal leg portion is fixed to a crest of said cellular subfloor duct assembly.

12. A bottomless trench duct according to claim 10, wherein said supporting side rail is generally L-shaped having a horizontal leg portion transversely overlying said cellular subfloor duct assembly and an upwardly extending vertical leg portion terminating in an inverted U-shaped channel.

13. A bottomless trench duct according to claim 12, wherein said inverted U-shaped channel is provided with a plurality of spaced slots.

14. A bottomless trench duct according to claim 13, wherein said spaced slots are adapted to receive a plurality of individually replaceable void closure means.

15. A bottomless trench duct according to claim 14, wherein said individually replaceable void closure means is comprised of a substantially flat plate having a periphery shaped to conform to the configuration of a particular trough and wherein at least one surface of said void closure plate is dimpled.

* * * * *